May 8, 1962  H. B. BABSON  3,033,161
MILKER SUPPORT

Filed May 7, 1958  2 Sheets-Sheet 1

INVENTOR
HENRY B. BABSON
BY
Schroeder, Hofgren, Brady & Wagner
ATTORNEYS

May 8, 1962 H. B. BABSON 3,033,161
MILKER SUPPORT
Filed May 7, 1958 2 Sheets-Sheet 2

INVENTOR
HENRY B. BABSON
BY
Schroeder, Hofgren, Brady & Wegner
ATTORNEYS

United States Patent Office 3,033,161
Patented May 8, 1962

3,033,161
MILKER SUPPORT
Henry B. Babson, Chicago, Ill., assignor to Babson
Bros. Co., a corporation of Illinois
Filed May 7, 1958, Ser. No. 733,676
6 Claims. (Cl. 119—14.13)

This invention relates to a milker support and in particular to means for adjustably supporting automatic milking apparatus during a milking operation.

In carry-away milking systems, milk is withdrawn from the cow's teats through a teat cup assembly attached thereto and connected through suitable means to a carry-away pipeline. To provide a proper tug and pull action on the cow's teats, it is desirable to support the teat cup assembly at a proper elevation and in a manner allowing a downward and forward force to be exerted, through the teat cups, on the cow's teats. One form of such an apparatus is shown in the Thomas Patent 2,783,737, issued March 5, 1957. The instant invention relates to an improved means for adjusting the elevation of the receptacle so that a proper tug and pull action may be effected with any one of a plurality of cows having udders depending to different elevations.

In the above Thomas patent, adjustment of the elevation of the milk receiving receptacle is effected through a rack and gear arrangement, with the gear operated by a handle to effect vertical adjustment of a post on which the receptacle is carried. Such a rack and pinion device has been found to have several disadvantages, e.g., the meshing mechanism requires periodic lubrication which, if not provided, permits the mechanism to become stiff and rusted. Further, when the mechanism is unlocked to permit adjustment, the entire weight of the mechanism and milking apparatus must be counterbalanced by the operator acting on the handle.

A principal feature of this invention is the provision of a new and improved means for adjustably supporting a milking apparatus.

Another feature is the provision of such means having a simplified structure permitting improved ease of maintenance.

A further feature is the provision of such means arranged for simplified operation and adjustment of the elevation of milking apparatus carried thereby.

Still another feature is the provision of such means arranged to counterbalance the weight of the milking apparatus and the carrying means and urge the milking apparatus to a predetermined desired elevation.

Yet a further feature is the provision of such means arranged for manual adjustment of the elevation from the predetermined counterbalanced elevation as desired.

Another feature is the provision of such means having simple and improved means for locking the mechanism at an adjusted elevation as desired.

And a further feature is the provision of an adjustable milking apparatus support mechanism including a vertically elongated member, means constraining the member for longitudinal movement only, a spring having a fixed portion and a portion yieldably displaceable from the fixed portion and associated with the elongated member to urge it to a predetermined elevation, a lever secured to the elongated member, locking means for releasably retaining the lever and the elongated member in any one of a plurality of different elevational positions, and means associated with the elongated member for carrying milking apparatus.

Other features and advantages of the invention will be apparent from the following description, taken in connection with the accompanying drawings wherein.

Figure 1:
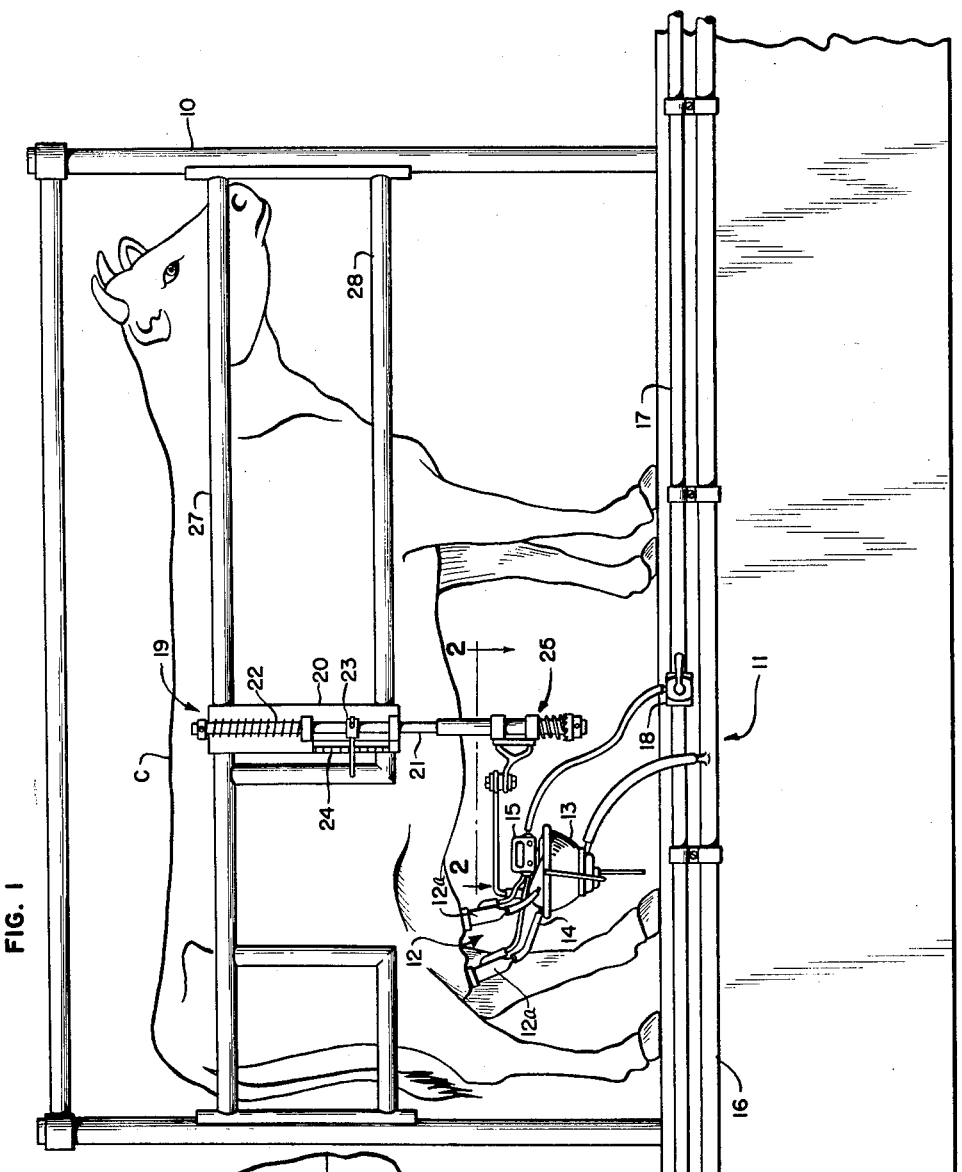
FIG. 1 is an elevation of a portion of a milking parlor showing a cow being milked by a carry-away milking apparatus supported by a mechanism embodying the invention.
Figure 2:
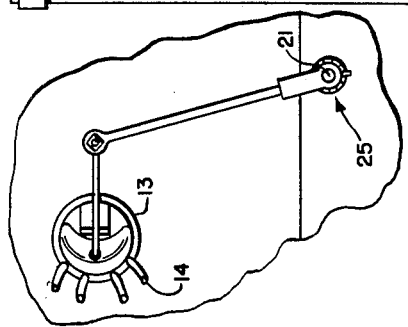
FIG. 2 is a fragmentary horizontal section taken approximately along the line 2—2 of FIG. 1.

In the embodiment of the invention disclosed in the drawing, a cow C, in a milking parlor stall 10, is shown being machine-milked with a carry-away milking system generally designated 11. In such a milking system, a teat cup assembly 12, including teat cups 12a of conventional construction, are attached to the cow's teats to deliver milk from the teats to a receptacle 13 through suitable interconnecting milk tubes 14. Associated with receptacle 13 is a pulsator 15 which provides a periodic vacuum condition within the shells of teat cups 12a to facilitate the automatic withdrawal of the milk. From the receptacle 13, the milk is delivered to a suitable carry-away milk pipeline 16. A vacuum line 17 extends adjacent milk pipeline 16 and is connected to pulsator 15 through a suitable valve 18.

Milking parlor stall 10 is so arranged that upon completion of a milking operation and removal of teat cups 12a from the cow's teats, the cow may leave the stall, permitting another cow to be admitted to the stall for a subsequent milking operation. As the height of the udders of different cows may vary substantially, it is desirable to provide means for supporting the receptacle 13 at correspondingly different elevations. To provide a proper tug and pull action on the cow's teats during a milking operation, it is desirable to adjust the elevation of receptacle 13 accurately to permit a downward and forward biasing thereof exerting a steady downward and forward force which is converted into the proper periodic tug and pull action on the cow's teats by the pulsating vacuum action effected by pulsator 15.

More specifically, the means for carrying receptacle 13 comprises a mechanism generally designated 19 including a support 20 fixed on stall 10, a rod 21 vertically movable on support 20, a spring 22 biasing rod 21 to a predetermined position, a lever 23 for manually adjusting the position of rod 21, locking means 24 for releasably holding the lever 23 in a selected position, and a carrying means 25 such as that disclosed in Thomas Patent 2,783,-737 for supporting receptacle 13 on one end of rod 21. In urging rod 21 upwardly, spring 22 counterbalances the weight of rod 21, lever 23, carrying means 25, and the elements of the milking system 11 supported by carrying means 25 to dispose receptacle 13 at a predetermined elevation which may correspond to a selected udder height, such as the median udder height of the group of cows to be milked. When the udder of the cow to be milked is lower than the median height, the operator urges lever 23 downwardly against the biasing action of spring 22 to position receptacle 13 at the proper lower elevation for that cow. Alternatively, if the udder of the cow is higher than the median elevation, handle 23 is urged upwardly from the counterbalanced position to place the receptacle at the correspondingly proper higher elevation. As the supported weight is counterbalanced originally by spring 22, the force necessary to effect an upward or downward movement of the mechanism is independent of the weight and is a function only of the spring constant which is preferably relatively low.

Figure 4:
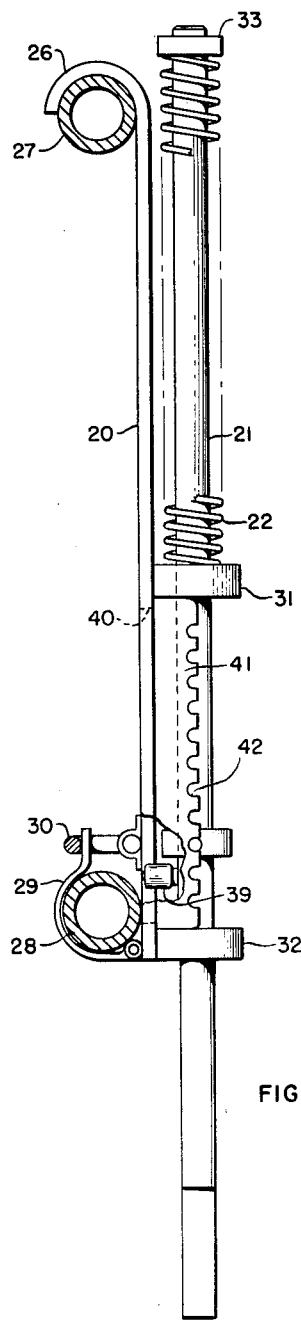
FIG. 4 is a side elevation thereof with a portion thereof broken away.
Figure 5:
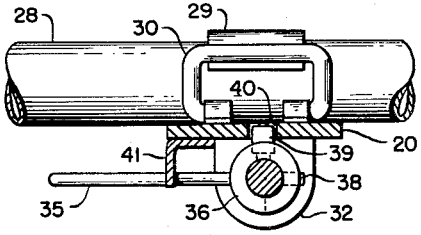
FIG. 5 is a horizontal section taken generally along the line 5—5 of FIG. 3.
Figure 3:
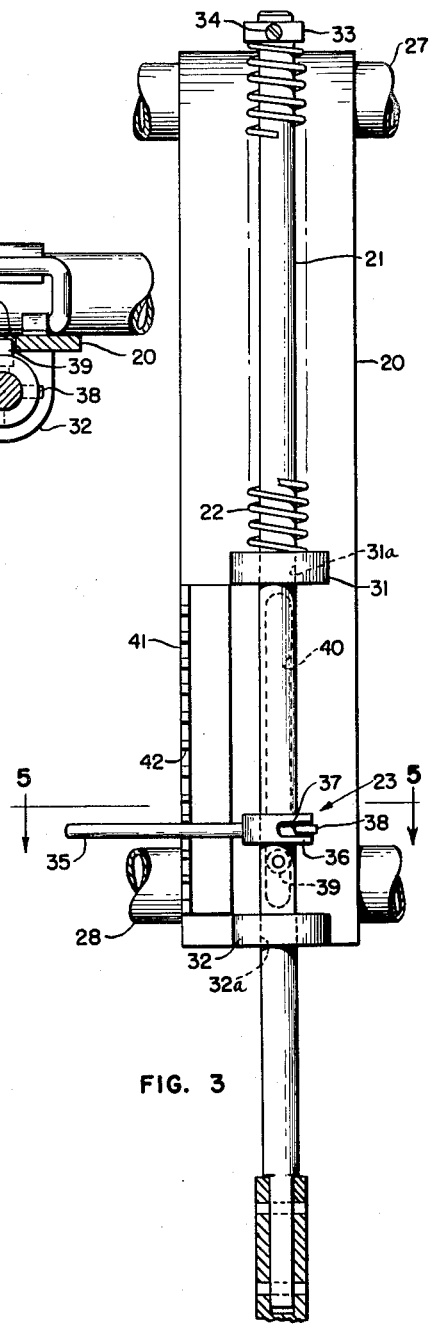
FIG. 3 is a fragmentary enlarged elevation of the supporting mechanism.

More specifically, and as best seen in FIGS. 3 through 5, support 20 comprises a rigid plate having a curved upper end 26 hooked over an upper horizontal cross member 27 of stall 10. The lower end of bracket 20 is secured to a lower cross member 28 by suitable means such as clamp 29 and locking ring 30. Projecting forwardly from plate 20 is a pair of brackets including an upper bracket 31 disposed intermediate the ends of the plate and a lower bracket 32 disposed at the lower end of the plate.

Rod 21 comprises an elongated cylindrical member extending longitudinally through vertically aligned bores 31a and 32a of brackets 31 and 32, respectively. The fit of rod 21 in bores 31a and 32a is preferably loose to permit the ready vertical longitudinal movement of rod 21. Spring 22 comprises a helical coil spring mounted on rod 21 to extend longitudinally between upper bracket 31 and a collar 33 fixedly secured at the upper end of rod 21 by suitable means such as set screw 34. As indicated above, the spring constant of spring 22 is preferably relatively low, herein being approximately two pounds per inch. The length of spring 22 and the disposition of collar 33 on rod 21 are co-ordinated so that the weight carried thereby is fully counterbalanced by the spring acting on collar 33 when receptacle 13 is at the predetermined selected elevation. Under this condition, lever 23 is disposed substantially midway between brackets 31 and 32, as seen in FIG. 1.

As alluded to briefly above, when it is desired to position receptacle 13 at other than the predetermined selected elevation, lever 23 is manually operated to move rod 21 upwardly or downwardly as necessary. As best seen in FIG. 3, lever 23 includes a handle portion 35 projecting radially from an annular connecting portion 36 rotatably mounted on rod 21 intermediate brackets 31 and 32. Connecting portion 36 is provided with a semicircular circumferential slot 37 diametrically opposite lever portion 35 and a pin 38 is secured to rod 21 to extend through a slot 37 to retain the lever against longitudinal movement relative to the rod while allowing pivotal movement of handle portion 35 relative to the rod axis between a first position (not shown) wherein the handle portion extends forwardly perpendicular to the plane of plate 20, and a second position (as seen in FIG. 3) wherein the handle portion extends parallel to the plane of plate 20. Means are provided to prevent rotation of rod 21 about its longitudinal axis including a roller 39 mounted on rod 21 to have its axis of rotation extend radially of the rod. Roller 39 projects into an elongated, vertically extending slot 40 in plate 20. Thus, as rod 21 moves upwardly or downwardly through brackets 31 and 32, roller 39 rolls through slot 40 and prevents rotation of rod 21 about its longitudinal axis.

To lock lever 23 in an adjusted position, such as shown in FIG. 3, plate 20 is provided with a forwardly projecting flange member 41 having a plurality of notches 42 defining the forward edge thereof. Notches 42 are adapted to retain handle portion 35 against upward or downward movement when the handle portion is inserted thereinto. Thus, all that is necessary to lock the mechanism 19 in an adjusted position is to swing handle portion 35 into the notch 42 corresponding to the selected elevation and release the handle portion. Spring 22 applies a sufficient upward or downward force (depending on whether the adjusted position is upwardly or downwardly from the counter-balanced centered position) to urge the handle portion 35 against either the top or bottom of the selected notch and cause the handle to be retained frictionally therein.

Thus, support mechanism 19 provides a new and improved means for adjusting the elevation of receptacle 13 in proper relationship with the height of the udder of the cow being milked. The adjustment may be readily effected merely by a simple manipulation of lever 23, and the adjustment may be maintained by simply inserting handle portion 35 in a correspondig notch 42. As the weight is counterbalanced by spring 22, the manipulation of lever 23 is effected with only a small amount of force, as determined only by the spring constant of spring 22, providing improved ease of adjustment. In addition, the simplified construction of mechanism 19 provides improved facility of maintenance.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. Mechanism for adjustably supporting milking apparatus during a milking operation, comprising: longitudinally constrained means for carrying a milking apparatus at any one of a plurality of vertically related positions including an uppermost position and a lowermost position; counterbalancing spring support means operably associated with the carrying means counterbalancing the weight of the milking apparatus and the carrying means and urging the carrying means and milking apparatus thereon to a predetermined elevation intermediate the uppermost and lowermost positions; longitudinally extending vertical adjustment means operably associated with the spring means for manual adjustment of the elevation of the carrying means and milking apparatus thereon above and below said predetermined elevation; and means releasably locking said carrying means at the adjusted elevation.

2. Mechanism for adjustably supporting milking apparatus, comprising: a vertically disposed elongated member; means constraining said member for longitudinal movement only; a support spring having a fixed portion and a portion yieldably displaceable from said fixed portion and operably connected to the elongated member urging the elongated member to a predetermined elevation; means associated with the elongated member for carrying a milking apparatus thereon; and vertically extending height adjustment means connected to the elongated member for moving it longitudinally selectively upwardly and downwardly relative to said predetermined elevation.

3. Mechanism for adjustably supporting milking apparatus, comprising: a vertically disposed elongated member; means constraining said member for longitudinal movement only; a spring having a fixed portion and a portion yieldably displaceable from said fixed portion and operably connected to the elongated member urging the elongated member to a predetermined elevation; a lever secured to said elongated member; locking means adjacent said lever releasably retaining the lever and thereby the elongated member in any one of a plurality of different elevational positions; and means associated with the elongated member for carrying a milking apparatus thereon.

4. The mechanism of claim 3 wherein the locking means comprises a member having a plurality of vertically spaced, horizontally opening notches removably receiving said lever to hold the lever against vertical movement.

5. Mechanism for adjustably supporting milking apparatus during a milking operation, comprising: a rod; vertically aligned bore means mounting said rod for vertical longitudinal movement; a support spring having one end fixed and the opposite end operably associated with the rod for urging the rod upwardly; means on the rod for carrying a milking apparatus, said spring counterbalancing the composite weight of the rod, said means on the rod, and the milking apparatus and disposing the milking apparatus at a predetermined elevation; a lever secured to the rod for raising and lowering the rod from the predetermined elevation against the action of the spring to correlate the elevation of the milking apparatus with the elevation of the udder of the cow being milked, and means releasably locking the rod in the correlated position.

6. The mechanism of claim 1 wherein the spring means has a small spring constant, such as of the order of two pounds per inch.

References Cited in the file of this patent

UNITED STATES PATENTS

| | | |
|---|---|---|
| 1,369,748 | Karro | Feb. 22, 1921 |
| 2,692,577 | Thomas | Oct. 26, 1954 |
| 2,916,248 | Ittermann et al. | Dec. 8, 1959 |